US012105444B2

(12) United States Patent
Hashimoto et al.

(10) Patent No.: US 12,105,444 B2
(45) Date of Patent: Oct. 1, 2024

(54) IMAGE FORMING APPARATUS CAPABLE OF SUPPRESSING INCREASE IN SIZE

(71) Applicant: BROTHER KOGYO KABUSHIKI KAISHA, Nagoya (JP)

(72) Inventors: Junichi Hashimoto, Toyohashi (JP); Yuwen Wang, Nagoya (JP); Takuya Amaike, Iwakura (JP); Soun Kanada, Iwakura (JP); Kazuma Hinoue, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/299,745

(22) Filed: Apr. 13, 2023

(65) Prior Publication Data

US 2023/0244159 A1 Aug. 3, 2023

Related U.S. Application Data

(63) Continuation of application No. 17/213,464, filed on Mar. 26, 2021, now Pat. No. 11,650,522.

(30) Foreign Application Priority Data

Apr. 1, 2020 (JP) ................................ 2020-066232

(51) Int. Cl.
*G03G 15/08* (2006.01)
*G03G 15/09* (2006.01)

(52) U.S. Cl.
CPC ..... *G03G 15/0891* (2013.01); *G03G 15/0921* (2013.01)

(58) Field of Classification Search
CPC .. G03G 21/105; G03G 21/1676; G03G 21/12; G03G 15/0872
See application file for complete search history.

(56) References Cited

U.S. PATENT DOCUMENTS 6,418,292 B1 * 7/2002 Isobe ................ G03G 15/0875 399/258
2006/0177230 A1 8/2006 Ishii
2007/0147889 A1 * 6/2007 Kamimura ......... G03G 21/1676 399/119

(Continued)

FOREIGN PATENT DOCUMENTS

JP 2000-284578 A 10/2000
JP 2006-171105 A 6/2006

(Continued)

OTHER PUBLICATIONS

International Search Report and Written Opinion issued in corresponding International Patent Application No. PCT/JP2021/012708, May 11, 2021.

(Continued)

*Primary Examiner* — Jessica L Eley
(74) *Attorney, Agent, or Firm* — Merchant & Gould P.C.

(57) ABSTRACT

An image forming apparatus including a housing, a toner cartridge, and a drum unit. The drum unit is movable through the opening between an accommodated position where the drum unit is positioned in the housing and a pulled-out position where the drum unit is pulled out of the housing. The drum unit includes a photosensitive drum and a developing unit. The photosensitive drum is rotatable about a first axis extending in a second direction. The developing unit includes a magnetic roller, a developer container, a first auger and a second auger. The magnetic roller is positioned between the toner cartridge and the photosensitive drum. The magnetic roller faces a surface of the photosensitive drum. The developer container is formed with an inlet allowing the toner to be replenished from the toner cartridge. The first auger is positioned in the developer container. The second auger is positioned in the developer container.

20 Claims, 9 Drawing Sheets

(56) References Cited

U.S. PATENT DOCUMENTS

| | | | |
|---|---|---|---|
| 2011/0064463 | A1 | 3/2011 | Hashimoto et al. |
| 2011/0217068 | A1 | 9/2011 | Kamimura et al. |
| 2012/0308259 | A1 | 12/2012 | Abe |
| 2014/0093275 | A1 | 4/2014 | Fukuchi et al. |
| 2014/0334846 | A1 | 11/2014 | Sato |
| 2014/0363197 | A1 | 12/2014 | Hashimoto |
| 2015/0050045 | A1 | 2/2015 | Sato et al. |
| 2019/0146405 | A1 | 5/2019 | Itabashi et al. |
| 2019/0286014 | A1* | 9/2019 | Michibata .......... G03G 15/0879 |

FOREIGN PATENT DOCUMENTS

| | | | |
|---|---|---|---|
| JP | 2006-201493 | A | 8/2006 |
| JP | 2007-199651 | A | 8/2007 |
| JP | 2010-085797 | A | 4/2010 |
| JP | 2011-059511 | A | 3/2011 |
| JP | 2012-247690 | A | 12/2012 |
| JP | 2013-54067 | A | 3/2013 |
| JP | 2015-036761 | A | 2/2014 |
| JP | 2014-238484 | A | 12/2014 |
| JP | 2015-194653 | A | 11/2015 |

OTHER PUBLICATIONS

Office Action issued in corresponding Japanese Patent Application 2020-066232, Mar. 5, 2024.

Office Action issued in corresponding Japanese application No. 2020-066232, Jul. 23, 2024.

* cited by examiner

IMAGE FORMING APPARATUS CAPABLE OF SUPPRESSING INCREASE IN SIZE

REFERENCE TO RELATED APPLICATIONS

This application is a continuation of U.S. patent application Ser. No. 17/213,464, filed Mar. 26, 2021, which claims priority from Japanese Patent Application No. 2020-066232 filed Apr. 1, 2020. The entire contents of the aforementioned applications are incorporated herein by reference.

BACKGROUND ART

Technical Field

The present disclosure relates to a drum unit which includes a conveying member configured to convey toner along with carrier, and an image forming apparatus which the drum unit can be attached to and detached from.

Background

Conventionally, there has been known an image forming apparatus including a housing, a drum unit, and a toner cartridge as described in Japanese Patent Application Publication No. 2006-171105. The drum unit includes a developer container accommodating therein toner and carrier. In addition to the developer container, the image forming apparatus further includes a toner replenishing device between the toner cartridge and the developer container. The toner replenishing device is configured to temporarily store and agitate toner supplied from the toner cartridge in order to replenish the toner to the developer container.

DESCRIPTION

Summary

In the above-mentioned prior art, in order to replenish the toner in the toner cartridge to the developer container, the toner replenishing device is further required in addition to the toner cartridge, the developer container and the drum unit. However, providing the toner replenishing device in the image forming apparatus may lead to the increase in size of the drum unit and the image forming apparatus.

In view of the foregoing, it is an object of the present disclosure to provide an image forming apparatus and a drum unit capable of suppressing the increase in size of the image forming apparatus and the drum unit.

In order to attain the above and other objects, according to one aspect, the disclosure provides an image forming apparatus including a housing, a toner cartridge, and a drum unit. The housing is formed with an opening and having a front cover movable between an open position where the front cover opens the opening and a closed position where the front cover closes the opening. The toner cartridge is configured to accommodate therein toner. The toner cartridge is attachable to the drum unit. The drum unit is movable in a first direction relative to the housing in a state where the toner cartridge is attached to the drum unit. The drum unit is movable through the opening between an accommodated position where the drum unit is positioned in the housing and a pulled-out position where the drum unit is pulled out of the housing. The drum unit includes a photosensitive drum and a developing unit. The photosensitive drum is rotatable about a first axis extending in a second direction. The developing unit is positioned between the toner cartridge and the photosensitive drum. The developing unit includes a magnetic roller, a developer container, a first auger and a second auger. The magnetic roller is positioned between the toner cartridge and the photosensitive drum and rotatable about a second axis extending in the second direction. The magnetic roller faces a surface of the photosensitive drum. The developer container is configured to accommodate carrier. The developer container is formed with an inlet allowing the toner to be replenished from the toner cartridge. The first auger is positioned in the developer container and rotatable about a third axis extending in the second direction. The first auger is configured to circulate the toner and the carrier in the developer container. The second auger is positioned in the developer container and rotatable about a fourth axis extending in the second direction. The second auger is configured to convey the toner and the carrier to the magnetic roller.

According to another aspect, the disclosure provides a drum unit to which a toner cartridge is attachable. The toner cartridge is configured to accommodate therein toner. The drum unit is movable in a first direction relative to the housing in a state where the toner cartridge is attached to the drum unit. The drum unit is movable through the opening between an accommodated position where the drum unit is positioned in the housing and a pulled-out position where the drum unit is pulled out of the housing. The drum unit includes a photosensitive drum and a developing unit. The photosensitive drum is rotatable about a first axis extending in a second direction. The developing unit is positioned between the toner cartridge and the photosensitive drum. The developing unit includes a magnetic roller, a developer container, a first auger and a second auger. The magnetic roller is positioned between the toner cartridge and the photosensitive drum and rotatable about a second axis extending in the second direction. The magnetic roller faces a surface of the photosensitive drum. The developer container is configured to accommodate carrier. the developer container is formed with an inlet allowing the toner to be replenished from the toner cartridge. The first auger is positioned in the developer container and rotatable about a third axis extending in the second direction. The first auger is configured to circulate the toner and the carrier in the developer container. The second auger is positioned in the developer container and rotatable about a fourth axis extending in the second direction. The second auger is configured to convey the toner and the carrier to the magnetic roller.

BRIEF DESCRIPTION OF THE DRAWINGS

The particular features and advantages of the disclosure will become apparent from the following description taken in connection with the accompanying drawings, in which.

DETAILED DESCRIPTION

Figure 1:
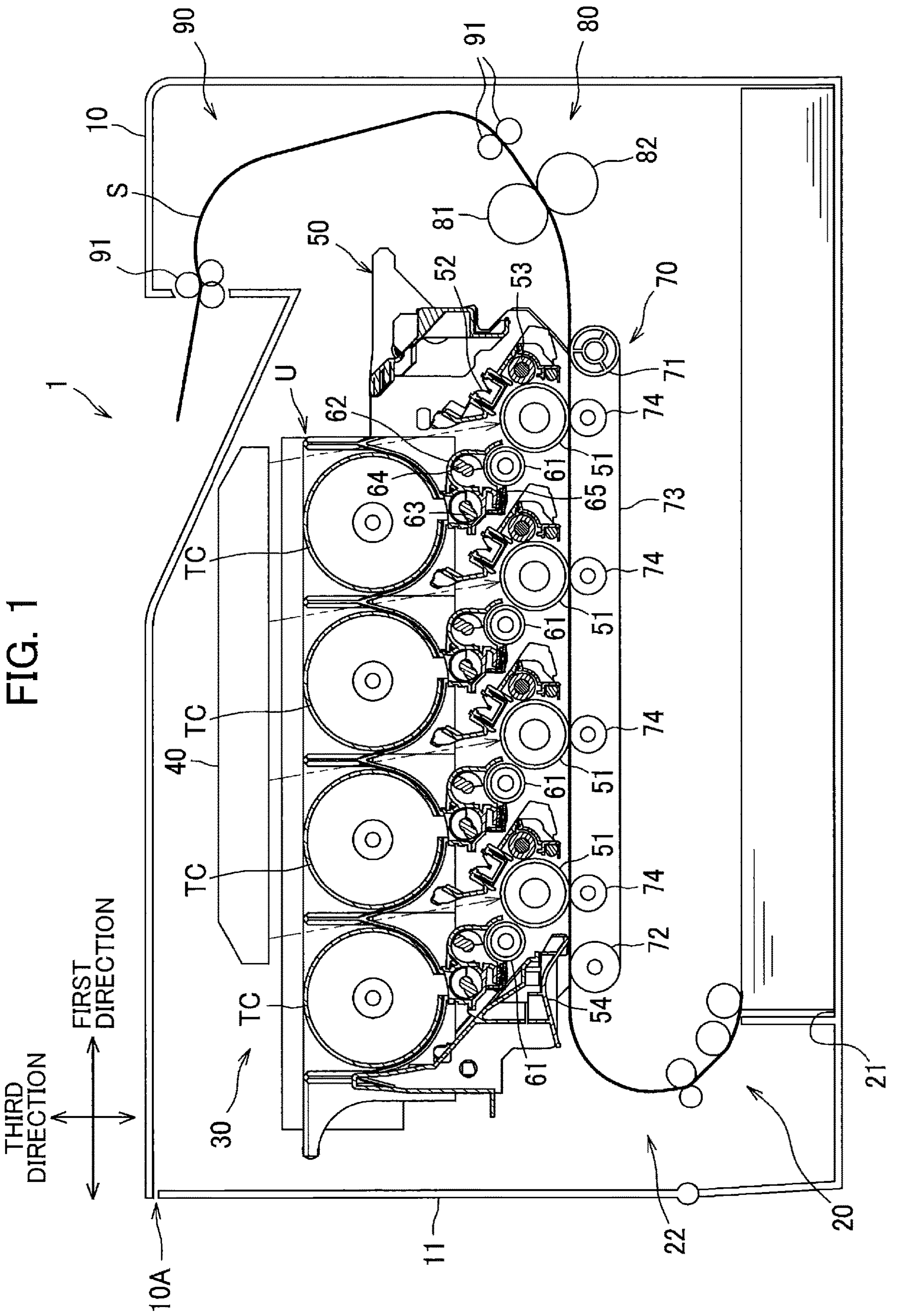
FIG. 1 is a cross-sectional view of a color printer including a drum unit according to one embodiment of the present disclosure.
Figure 2:
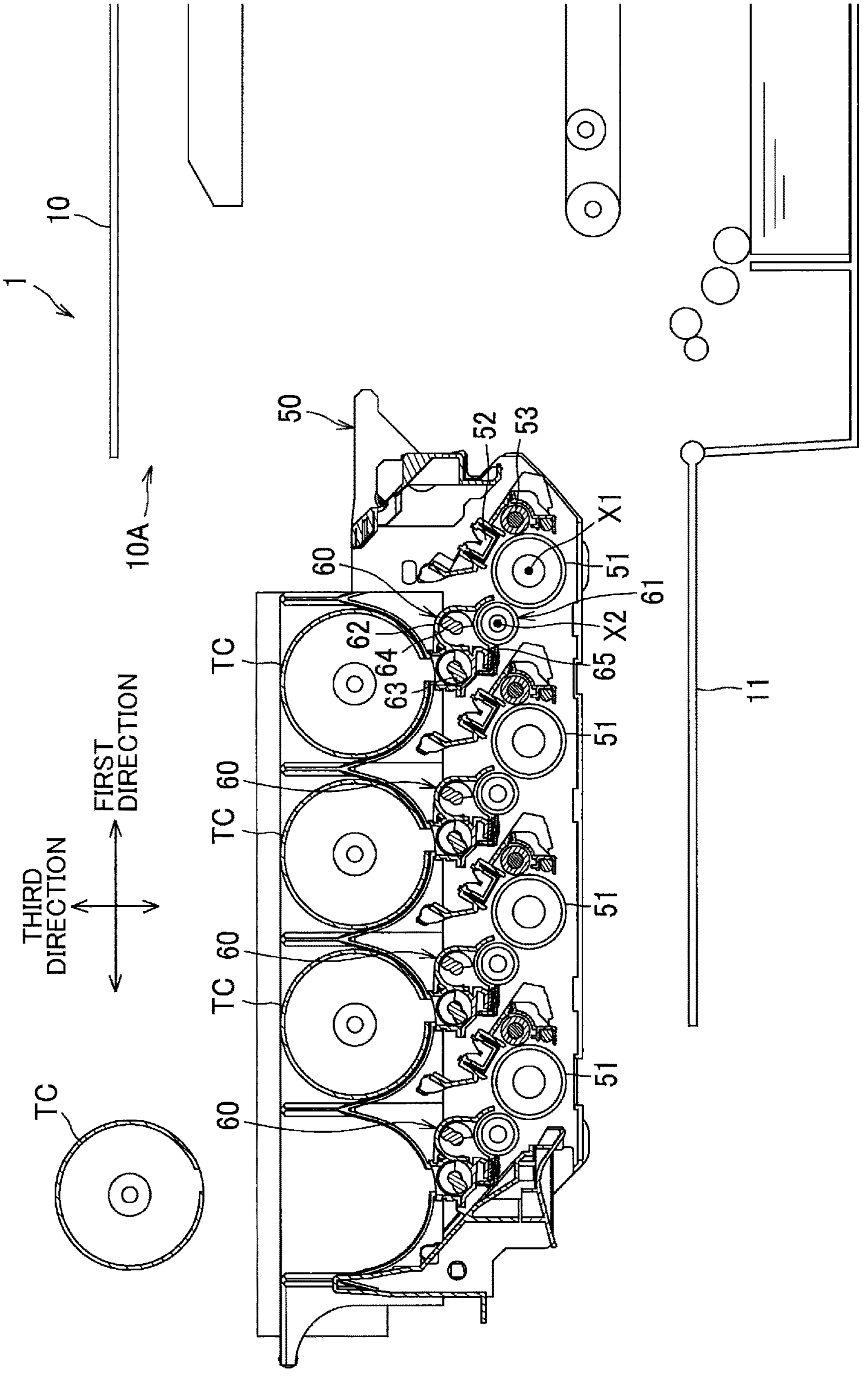
FIG. 2 is a cross-sectional view of the drum unit positioned at a pulled-out position.

Hereinafter, a drum unit according to one embodiment of the present disclosure will be described with reference to the accompanying drawings. Firstly, an overall structure of a color printer 1 as an example of an image forming apparatus to which the drum unit is applied will be described with reference to FIG. 1. The color printer 1 includes a housing 10, a sheet supply unit 20, an image forming unit 30, and a discharge unit 90.

The housing 10 has an opening 10A and includes a front cover 11. The front cover 11 is movable between an open position where the front cover 11 opens the opening 10A and a closed position where the front cover 11 closes the opening 10A. Specifically, the front cover 11 is pivotally movable between the open position and the closed position.

The sheet supply unit 20 includes a supply tray 21, and a sheet feed mechanism 22. The supply tray 21 is configured to store a stack of sheets S. The sheet feed mechanism 22 is configured to convey the sheet S to the image forming unit 30 from the supply tray 21. A heavy paper, a postcard, and a thin paper are available as the sheet S.

The image forming unit 30 includes a scanner unit 40, a process unit U, a transfer unit 70, and a fixing unit 50.

The scanner unit 40 includes a laser emitting portion, a polygon mirror, lenses and reflection mirrors those not illustrated.

The process unit U includes a drum unit 50, and four toner cartridges TC.

Figure 3:
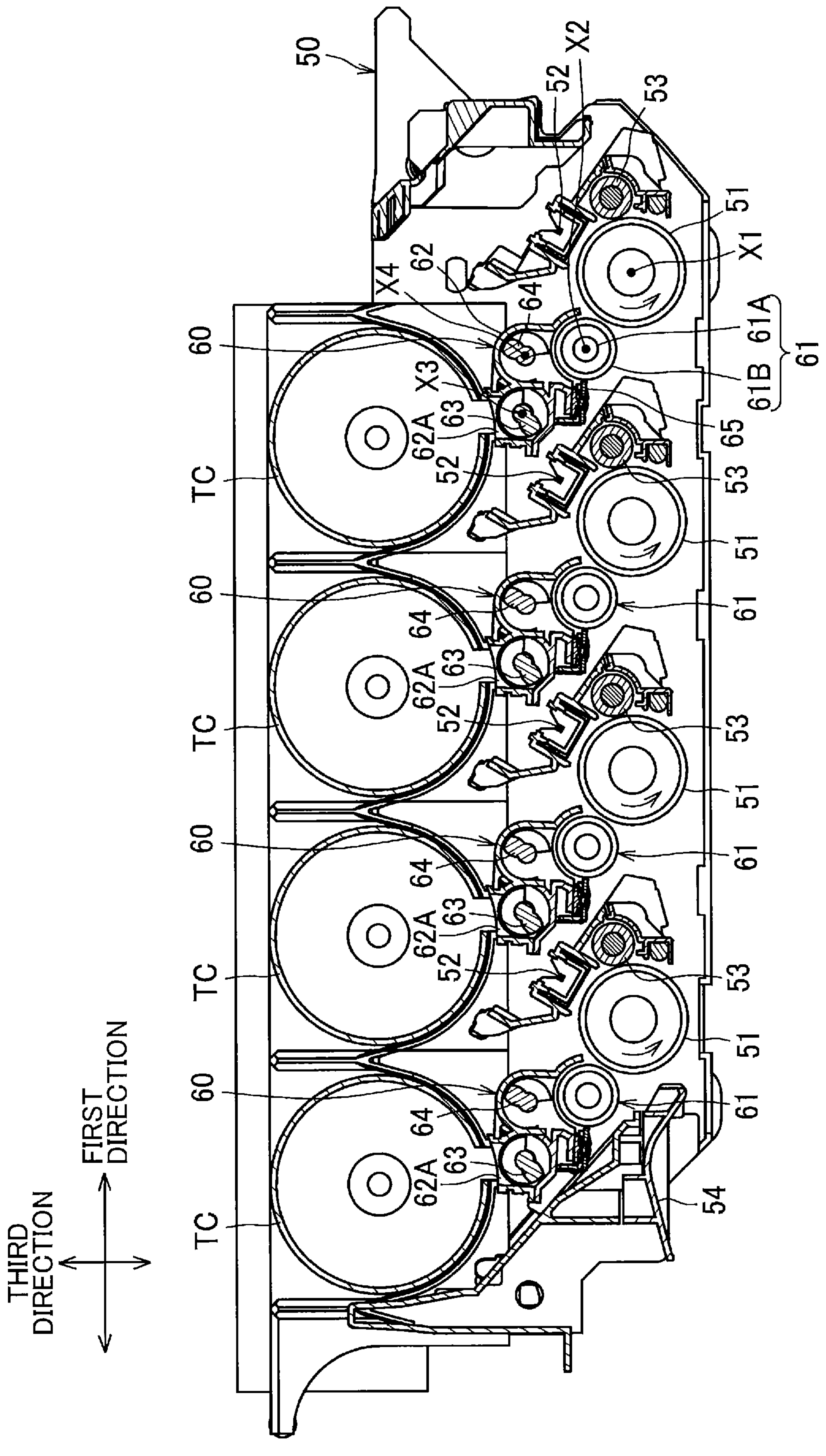
FIG. 3 is a cross-sectional view of the drum unit to which toner cartridges are attached.

The toner cartridge TC is configured to accommodate therein toner which is non-magnetic material. As illustrated in FIG. 3, the four toner cartridges TC are attachable to and detachable from a frame of the drum unit 50. Specifically, each toner cartridge TC is attachable to and detachable from the frame of the drum unit 50 in a direction perpendicular to the second direction (described later). The frame of the drum unit 50 will be described later with reference to FIGS. 6 through 9.

The drum unit 50 is movable in a first direction relative to the housing 10 through the opening 10A.

Specifically, the drum unit 50 is movable in the first direction between an accommodated position where the drum unit 50 is accommodated in the housing 10 and a pulled-out position where the drum unit 50 is pulled out of the housing 10. As illustrated in FIG. 3, the drum unit 50 includes four photosensitive drums 51, four scorotron chargers 52, four cleaning rollers 53, four developing units 60, and a sheet guide 54. The above-described scanner unit 40 is configured to irradiate laser beam to the photosensitive drums 51.

The photosensitive drum 51 is rotatable about a first axis X1 extending in the second direction. The second direction crosses the first direction, and specifically, the second direction is perpendicular to the first direction. The four photosensitive drums 51 are arrayed one after another in the first direction.

The scorotron charger 52 is configured to charge the photosensitive drum 51. Incidentally, a charge roller may be employed instead of the scorotron charger 52. The cleaning roller 53 is configured to perform cleaning on the photosensitive drum 51. Incidentally, a cleaning blade may be employed instead of the cleaning rollers 53.

The four developing units 60 are arrayed one after another in the first direction. Each developing unit 60 is positioned between each toner cartridge TC and each photosensitive drum 51. The developing unit 60 includes a magnetic roller 61, a developer container 62, a first auger 63, a second auger 64, and a layer thickness regulation blade 65.

The magnetic roller 61 is configured to supply toner to the photosensitive drum 51. The magnetic roller 61 includes a magnetic shaft 61A and a magnetic sleeve 61B. The magnetic shaft 61A has alternating magnetic poles with a predetermined pattern in a circumferential direction thereof. The magnetic shaft 61A is a solid cylindrical member in which a plurality of permanent magnets are embedded. The magnetic shaft 61A is fixed to the developer container 62.

The magnetic sleeve 61B is a hollow cylindrical member made from non-magnetic metal as main component. The magnetic sleeve 61B is rotatable about the magnetic shaft 61A. The magnetic sleeve 61B retains toner by magnetic force of the magnetic shaft 61A.

The magnetic roller 61 is positioned between the toner cartridge TC and the photosensitive drum 51. The magnetic sleeve 61B is rotatable about a second axis X2 extending in the second direction. The magnetic roller 61 faces the surface of the photosensitive drum 51. The magnetic roller 61 is separated from the surface of the photosensitive drum 51.

The developer container 62 is configured to accommodate carrier which is magnetic material. Iron powder is an example of the carrier. The developer container 62 has an inlet 62A through which toner is replenished from the toner cartridge TC. The inlet 62A is positioned opposite to the magnetic roller 61 with respect to the first auger 63 and the second auger 64. The above described toner cartridge TC is attached to the developer container 62 in accordance with the attachment of the toner cartridge TC to the frame of the drum unit 50.

The inlet 62A is positioned above the first auger 63 and the second auger 64. Specifically, the inlet 62A is positioned vertically above the first auger 63. The second axis X2 is positioned below the first auger 63 and the second auger 64. Specifically, the second axis X2 is positioned vertically below the second auger 64.

The first auger 63 is positioned in the developer container 62. The first auger 63 is rotatable about a third axis X3 extending in the second direction. The first auger 63 and the second auger 64 are arrayed with each other in the first direction. The first auger 63 is positioned closer to the inlet 62A than the second auger 64 is to the inlet 62A. The first auger 63 is configured to perform circulation of the toner and the carrier in the developer container 62. The first auger 63 is configured to convey the toner replenished from the inlet 62A to the second auger 64.

The second auger 64 is positioned in the developer container 62. The second auger 64 is rotatable about a fourth axis X4 extending in the second direction. The second auger 64 is configured to convey the toner and the carrier in the developer container 62 toward the magnetic roller 61. In other words, the second auger 64 is configured to supply toner to the magnetic roller 61. The second auger 64 is configured to perform circulation of the toner and the carrier in the developer container 62.

The layer thickness regulation blade 65 is configured to regulate a thickness of a toner layer formed on the magnetic roller 61. The layer thickness regulation blade 65 is out of contact with the magnetic roller 61. The layer thickness regulation blade 65 is positioned below the first auger 63 and the second auger 64. Specifically, the layer thickness regulation blade 65 is positioned vertically below the first auger 63.

The layer thickness regulation blade 65 is arrayed with the magnetic roller 61 in the first direction. The second axis X2 is positioned between the layer thickness regulation blade 65 and the first axis X1 in the first direction.

The sheet guide 54 is configured to guide the sheet S toward the photosensitive drums 51. The sheet guide 54 is arrayed with the photosensitive drums 51 in the first direction. The sheet guide 54 is positioned at upstream side of the four photosensitive drums 51 in a conveying direction of the sheet S.

The magnetic roller 61 positioned at most upstream side in the sheet conveying direction among the four magnetic rollers 61 is positioned between the sheet guide 54 and the second auger 64. Further, each of the four magnetic rollers 61 is positioned between the sheet guide 54 and the first and second augers 63, 64 in a third direction perpendicular to the first and second directions. The layer thickness regulation blade 65 positioned at most upstream side in the sheet conveying direction among the four layer thickness regulation blades 65 is positioned between the sheet guide 54 and the first auger 63. Further, each of the four layer thickness regulation blades 65 is positioned between the sheet guide 54 and the first and second augers 63, 64 in the third direction.

As illustrated in FIG. 1, the transfer unit 70 is configured to transfer toner images on the photosensitive drums 51 to the sheet S. The transfer unit 70 is positioned between the sheet supply unit 20 and the drum unit 50. The transfer unit 70 includes a drive roller 71, a follower roller 72, a conveyer belt 73, and transfer rollers 74.

The drive roller 71 and the follower roller 72 are spaced away from each other in the first direction. The conveyer belt 73 is an endless belt looped over the drive roller 71 and the follower roller 72. The transfer rollers 74 are positioned in a space encircled by the conveyer belt 73. The conveyer belt 73 is nipped between the photosensitive drums 51 and the transfer rollers 74. The conveyer belt 73 is an example of a transfer member.

The fixing unit 80 includes a heat roller 81 and a pressure roller 82. The sheet S is nipped between the heat roller 81 and the pressure roller 82. The discharge unit 90 includes a plurality of discharge rollers 91.

In the image forming unit 30, the scorotron charger 52 charges the surfaces of the photosensitive drum 51, and thereafter, the scanner unit 40 irradiates laser beam to the surface of the photosensitive drum 51, whereupon an electrostatic latent image is formed on the surface of the photosensitive drum 51.

The toner cartridge TC replenishes toner to the interior of the developer container 62. The first auger 63 conveys toner and carrier in the developer container 62 to the second auger 64. The second auger 64 supplies toner to the magnetic roller 61. The magnetic roller 61 supplies toner to the electrostatic latent image formed on the surface of the photosensitive drum 51. Hence, toner image is formed on the photosensitive drum 51.

The conveyer belt 73 conveys the sheet S, so that the sheet S moves through a portion between the photosensitive drums 51 and the transfer rollers 74. At this time, each toner image formed on each photosensitive drum 51 is successively transferred onto the sheet S. Then, the sheet S passes through a portion between the heat roller 81 and the pressure roller 82. At this time, toner image on the sheet S is thermally fixed to the sheet S. Then, the conveyer rollers 91 conveys the sheet S to a position outside the housing 10.

Figure 4A:
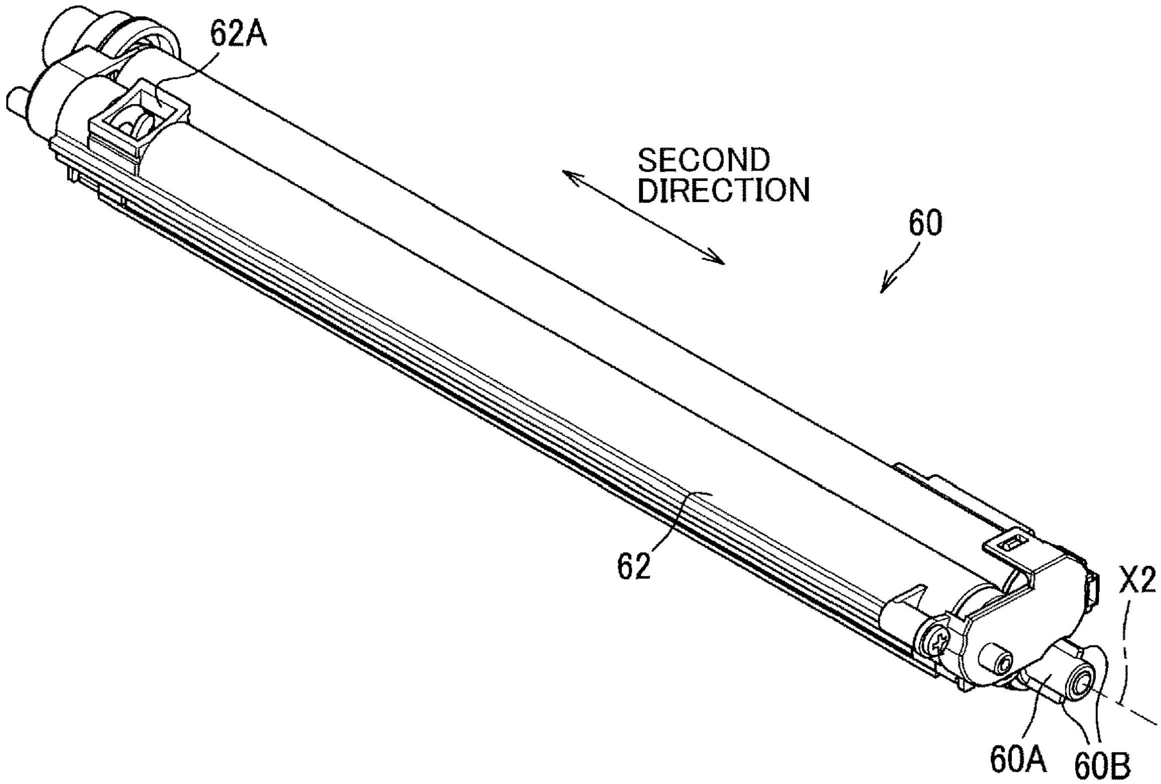
FIG. 4A is a perspective view of a developing unit.

As shown in FIG. 4A, the developing unit 60 has one end portion in the second direction including a boss 60A and a pair of protrusions 60B. The boss 60A extends in the second direction. The boss 60A has an outer peripheral surface centered on the second axis X2.

The pair of protrusions 60B protrude from the outer peripheral surface of the boss 60A in the direction perpendicular to the second direction. The second axis X2 is positioned between the pair of protrusions 60B. The boss 60A extends in a direction away from the developer container 62 farther than the pair of protrusions 60B.

Figure 4B:
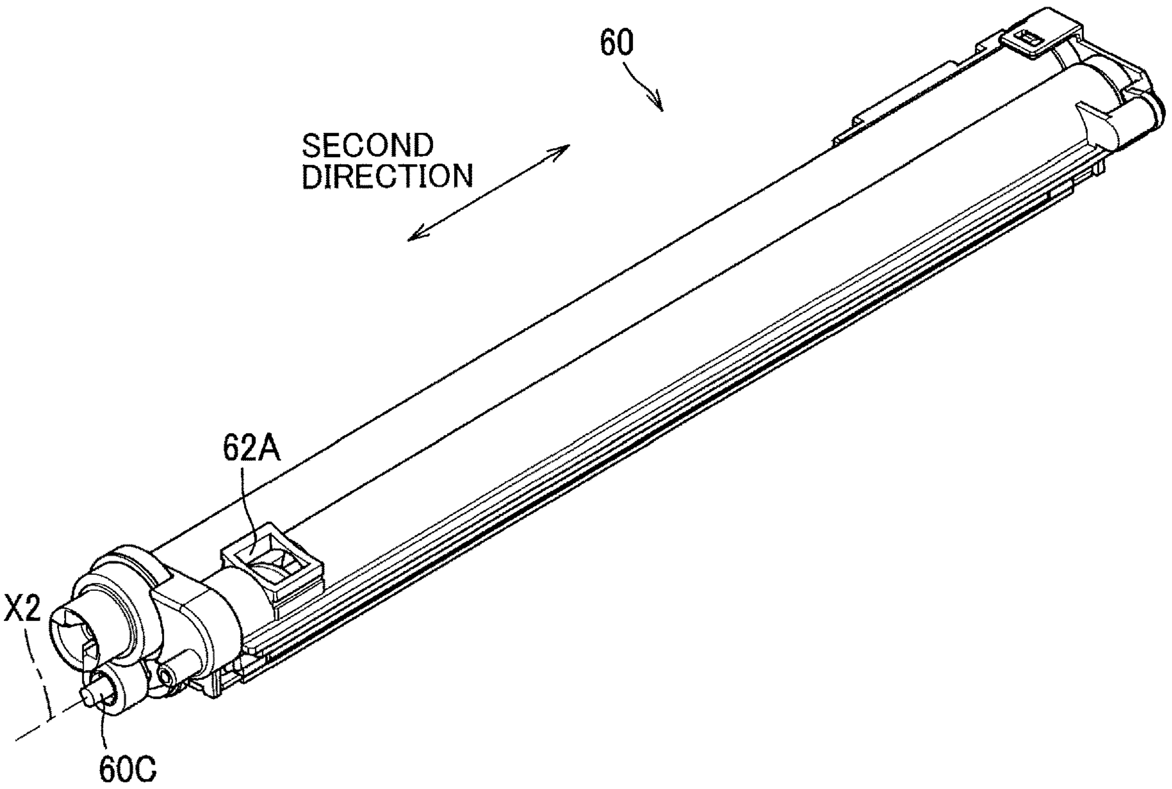
FIG. 4B is another perspective view of the developing unit.

As shown in FIG. 4B, the developing unit 60 has another end portion in the second direction including a shaft 60C. The shaft 60C extends in the second direction. The shaft 60C has an outer peripheral surface centered on the second axis X2. An outer diameter of the shaft 60C is smaller than an outer diameter of the boss 60A. The inlet 62A is positioned at another end portion in the second direction of the developer container 62.

Figure 5:
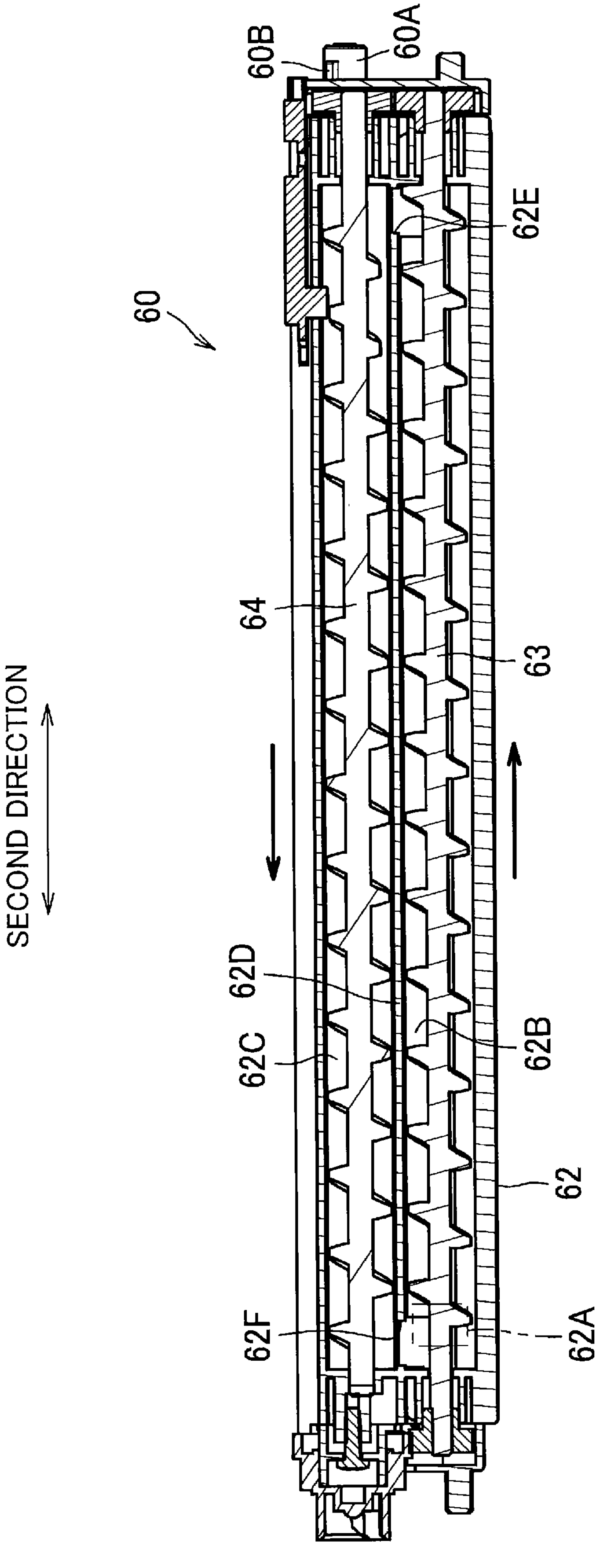
FIG. 5 is a cross-sectional view of the developing unit.
Figure 6:
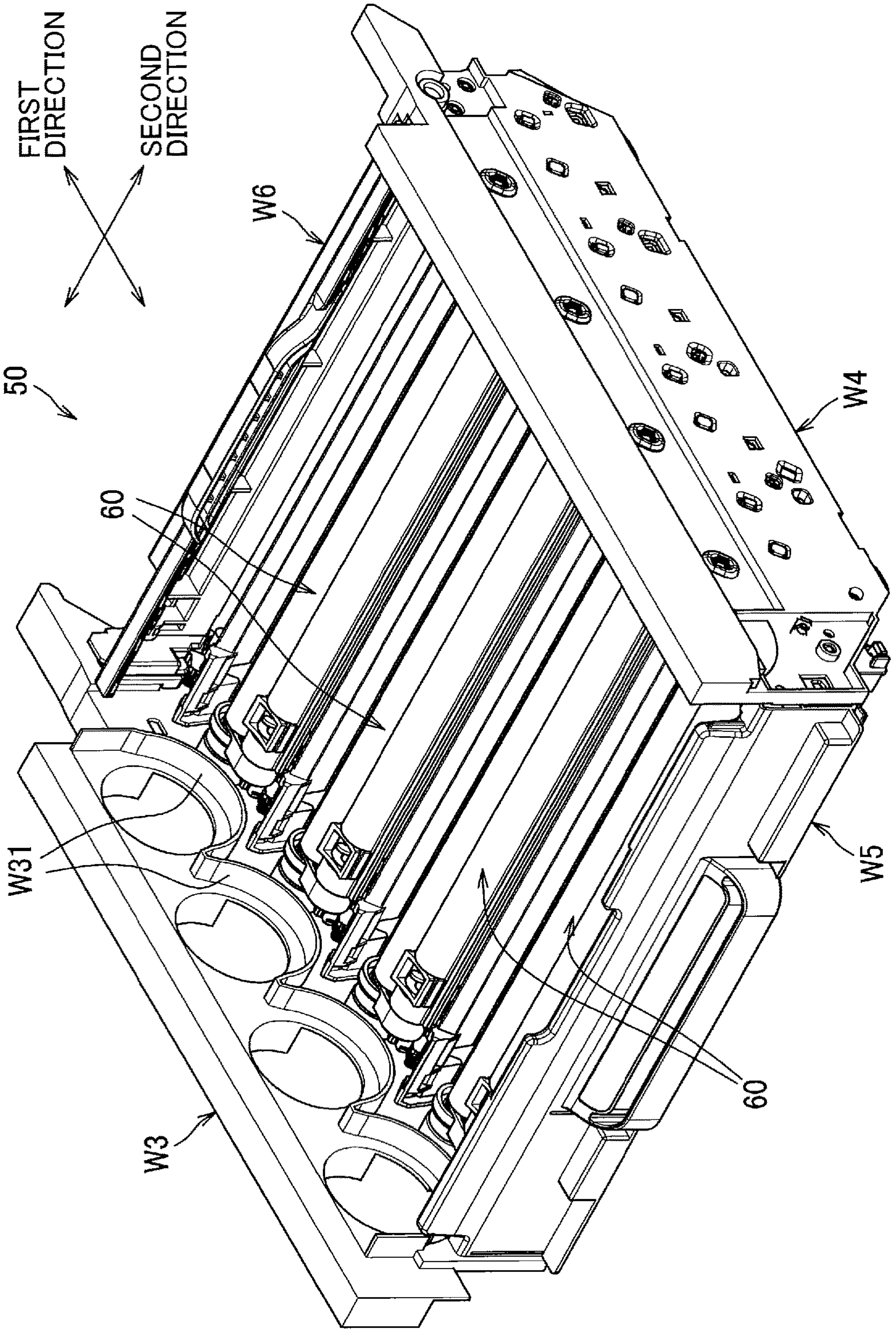
FIG. 6 is a perspective view of the drum unit according to the embodiment.

As shown in FIG. 5, the developer container 62 includes a first accommodation chamber 62B, a second accommodation chamber 62C, and a partition wall 62D, and is formed with a supply opening 62E, and a recovery opening 62F. The first accommodation chamber 62B defines an internal space in which the first auger 63 is accommodated. The second accommodation chamber 62C defines an internal space in which the second auger 64 is accommodated. Toner and carrier are accommodated in the first accommodation chamber 62B and the second accommodation chamber 62C.

The partition wall 62D partitions the developer container 62 into the first accommodation chamber 62B and the second accommodation chamber 62C. The supply opening 62E is positioned at one end of the partition wall 62D in the second direction. The supply opening 62E allows the first accommodation chamber 62B and the second accommodation chamber 62C to communicate with each other. The supply opening 62E permits the toner and the carrier to move from the first accommodation chamber 62B to the second accommodation chamber 62C.

The recovery opening 62F is positioned at another end of the partition wall 62D in the second direction. The recovery opening 62F allows the first accommodation chamber 62B and the second accommodation chamber 62C to communicate with each other. The supply opening 62E permits the toner and the carrier to move from the second accommodation chamber 62C to the first accommodation chamber 62B.

The inlet 62A is open to the first accommodation chamber 62B. A distance from the inlet 62A to the supply opening 62E is greater than a distance from the inlet 62A to the recovery opening 62F.

The first auger 63 is configured to convey the toner replenished into the first accommodation chamber 62B through the inlet 62A to the supply opening 62E along with the carrier. The second auger 64 is configured to convey the toner supplied into the second accommodation chamber 62C through the supply opening 62E toward another end of the developer container 62 in the second direction. Toner conveyed in the second direction by the second auger 64 is attracted to the surface of the magnetic roller 61 because of the magnetic force thereof. The toner and the carrier conveyed to the other end of the developer container 62 in the second direction is moved to the first accommodation chamber 62B through the recovery opening 62F.

As illustrated in FIGS. 6 through 9, the frame of the drum unit 50 supporting the photosensitive drums 51 and the developing units 60 includes a first side wall W1, a second side wall W2, a third side wall W3, a fourth side wall W4, a front wall W5, and a rear wall W6. The frame is configured to support the photosensitive drum 51 and the developing unit 60. These walls W3, W4, W5, W6 are made from resin.

Each developing unit 60 is positioned between the third side wall W3 and the fourth side wall W4 in the second direction. The front wall W5 spans between one end portion in the first direction of the third side wall W3 and one end portion in the first direction of the fourth side wall W4. The rear wall W6 spans between another end portion in the first direction of the third side wall W3 and another end portion in the first direction of the fourth side wall W4.

The third side wall W3 includes a cartridge support portion W31. The cartridge support portion W31 is configured to support an outer peripheral surface of the toner cartridge TC. The fourth side wall W4 includes a cartridge support portion similar to the cartridge support portion W31.

Figure 7:
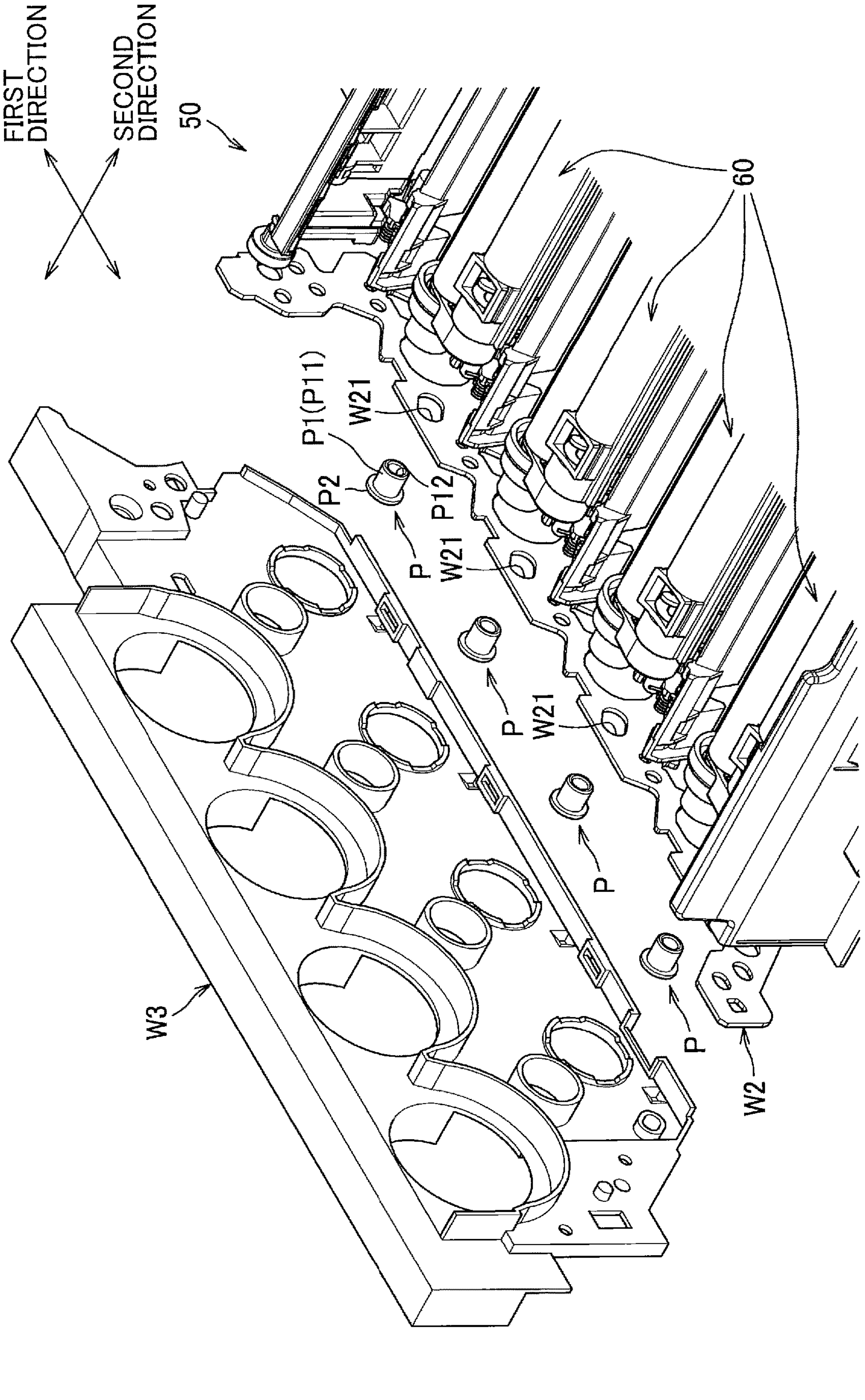
FIG. 7 is an exploded perspective view showing a structure of another side in the second direction of the drum unit.
Figure 8:
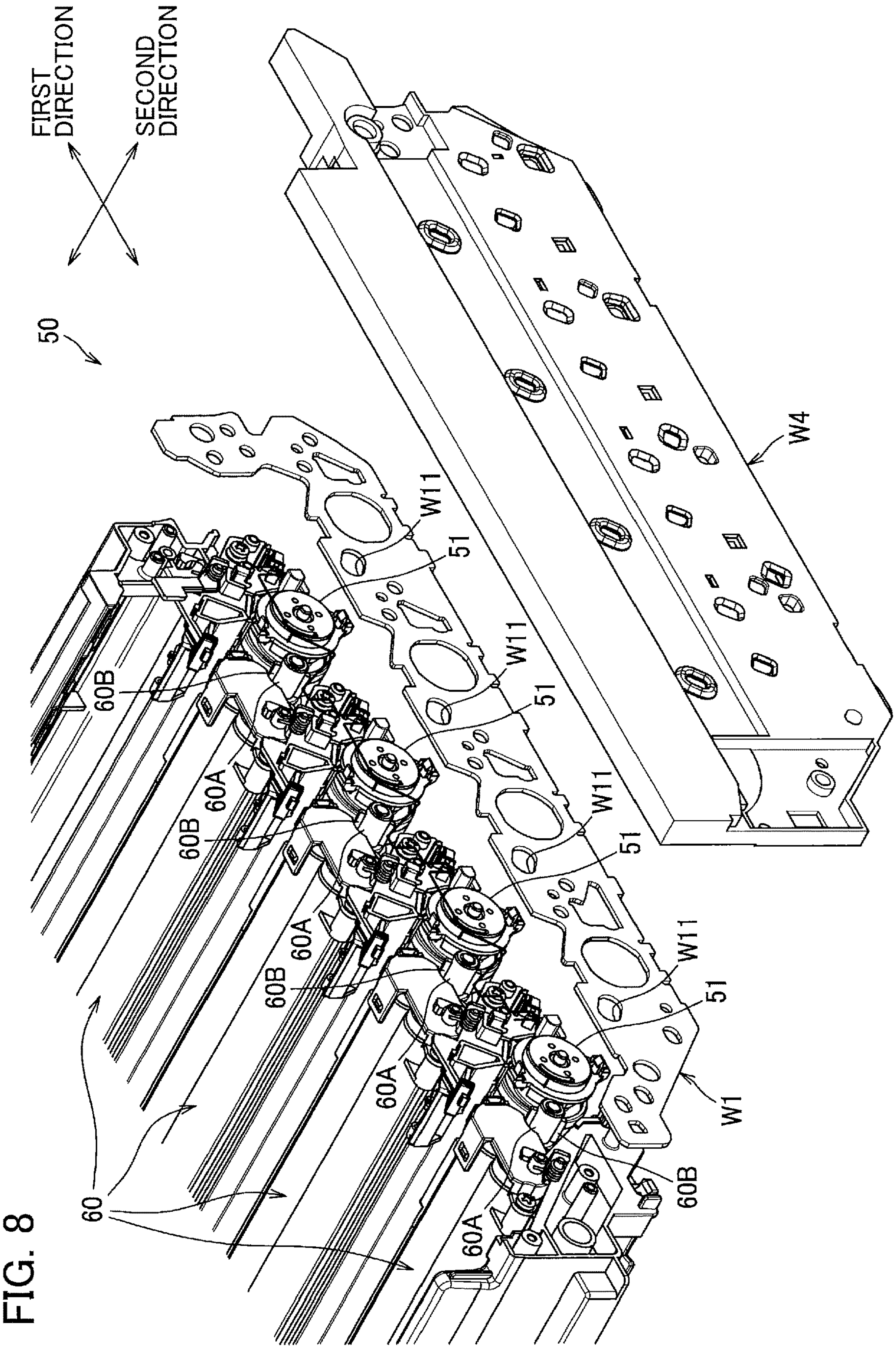
FIG. 8 is an exploded perspective view showing a structure of one side in the second direction of the drum unit.

As shown in FIGS. 7 and 8, the first side wall W1 and the second side wall W2 are plates supporting each end portions of the photosensitive drum 51 and the developing unit 60 in the second direction. The first side wall W1 and the second side wall W2 are made from metal, for example.

The first side wall W1 is formed with four first holes W11. The first hole W11 allows the boss 60A positioned at the one end portion of the developing unit 60 in the second direction to extends through the first hole W11. That is, the boss 60A is inserted in the first hole W11. Hence, the boss 60A is supported by the first side plate W1. The second side wall W2 faces the first side wall W1 in the second direction. The second side wall W2 is formed with four second holes W21. The pair of protrusions 60B positioned on the outer peripheral surface of the boss 60A is in contact with a surface W12 of the first side wall W1 facing the second side wall W2 to fix a position of the developing unit 60 in the second direction (see FIGS. 9B and 9C). The fourth side wall W4 is positioned opposite to the second side wall W2 with respect to the first side wall W1.

As shown in FIG. 7, the drum unit 50 includes four cylindrical members P. Each of four cylindrical members P includes a cylinder P1 and flange P2.

The cylinder P1 has a cylindrical shape. The cylinder P1 is inserted into the second hole W21. The cylinder P1 has an outer peripheral surface P11 and an opening P12. The shaft 60C (illustrated in FIG. 4B) positioned at the other end portion of the developing unit 60 in the second direction is inserted into the opening P12.

The flange P2 protrudes radially outward from the outer peripheral surface P11 of the cylinder P11. The flange P2 is positioned opposite to the first side wall W1 with respect to the second side wall W2. The third side wall W3 is positioned opposite to the first side wall W1 with respect to the second side wall W2.

Figure 9A:
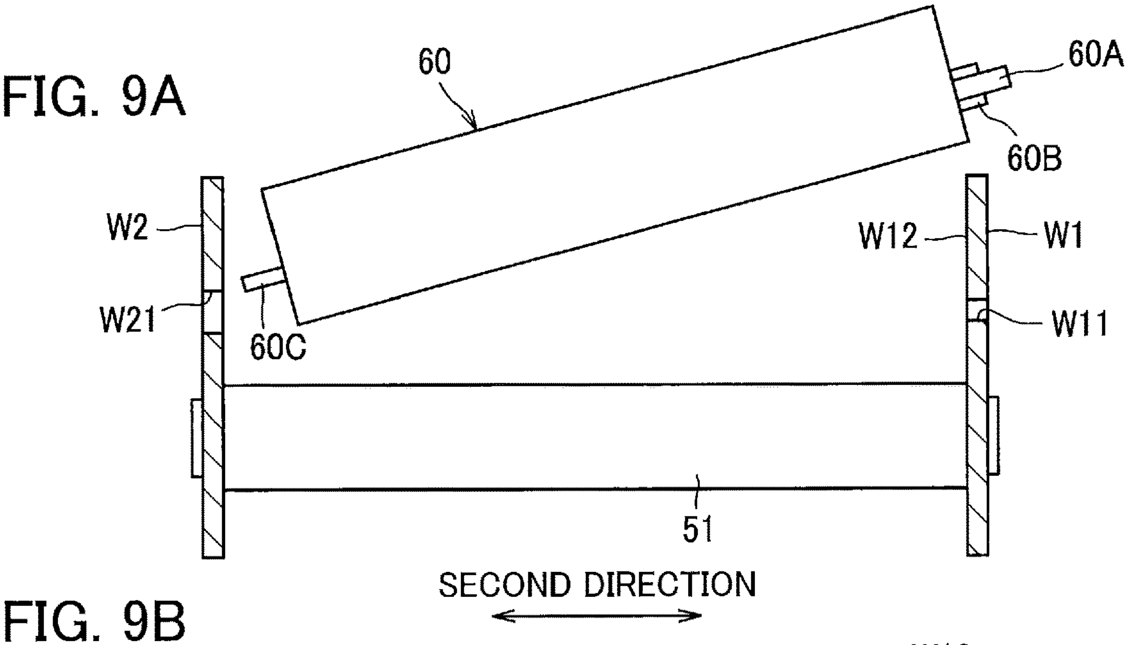
FIG. 9A is a diagram showing a method for assembling the drum unit.
Figure 9B:
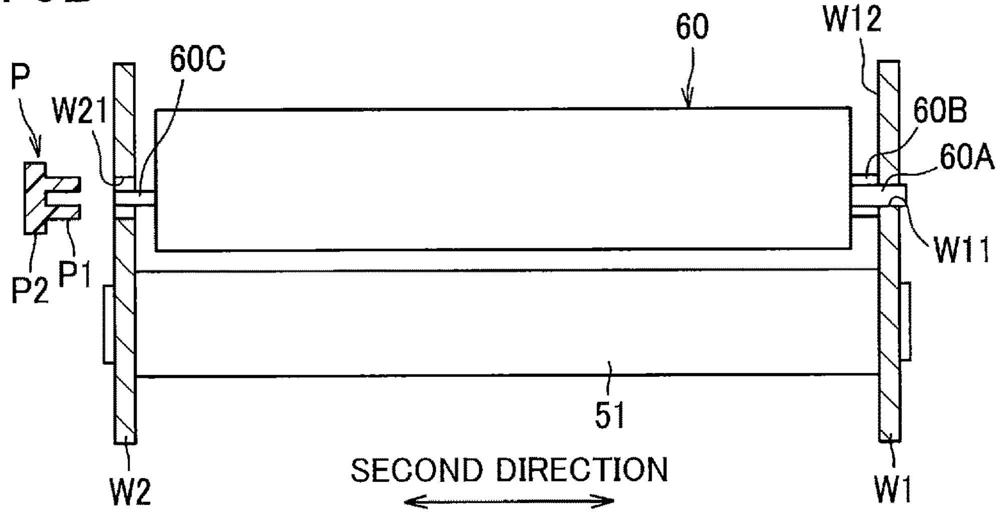
FIG. 9B is another diagram showing the method for assembling the drum unit.
Figure 9C:
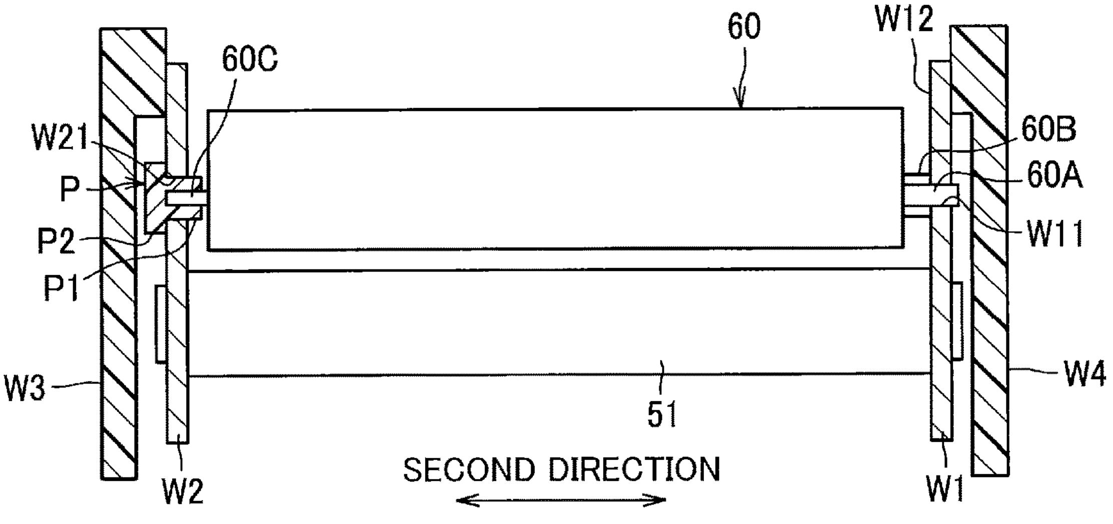
FIG. 9C is still another diagram showing the method for assembling the drum unit.

As shown in FIG. 9C, the flange P2 is positioned between the second side wall W2 and the third side wall W3 in the second direction. The first side wall W1 and the second side wall W2 are positioned between the third side wall W3 and the fourth side wall W4 in the second direction.

Next, a method of assembling the drum unit 50 will be described. As shown in FIG. 9A, each of the photosensitive drums 51 is attached to the first side wall W1 and the second side wall W2. Although illustration is omitted, a unit including the scorotron charger 52 and the cleaning roller 53 is also attached to the first side wall W1 and the second side wall W2.

Then, as shown in FIGS. 9A and 9B, the shaft 60C of the developing unit 60 is inserted into the second hole W21 of the second side wall W2. Then, the boss 60A of the developing unit 60 is inserted into the first hole W11 in a direction from the second side wall W2 to the first side wall W1. As a result, the pair of protrusions 60B come into contact with the surface W12 of the first side wall W1, the surface W12 facing the second side wall W2.

After the pair of protrusions 60B contact the surface W12 of the first side wall W1 facing the second side wall W2, the cylindrical member P is inserted into the second hole W21 in the direction from the second side wall W2 to the first side wall W1 and is attached to the shaft 60C of the developing unit 60. Hence, the flange P2 is positioned opposite to the first side wall W1 with respect to the second side wall W2.

Then, as shown in FIG. 9C, the third side wall W3 is attached to the surface of the second side wall W2, the surface being opposite to the surface of the second side wall W2 facing the first side wall W1. Further, the fourth side wall W4 is attached to the surface of the first side wall W1, the surface being opposite to the surface W12.

The following effects can be obtained in the present embodiment. The toner cartridge TC is attachable to the drum unit 50, and the toner is directly replenished from the toner cartridge TC attached to the drum unit 50 to the developing container 62. Therefore, conventional toner replenishing device can be omitted, and hence, an increase in size of the drum unit 50 and the color printer 1 can be suppressed.

Since the flange P2 is positioned opposite to the first side wall W1 with respect to the second side wall W2, a release of the cylindrical member P from the second side wall W2 can be restrained.

Since the flange P2 is sandwiched between the second side wall W2 and the third side wall W3, the release of the cylindrical member P from the second side wall W2 can further be restrained.

Since the first side wall W1 and the second side wall W2 are positioned between the third side wall W3 and the fourth side wall W4, the first side wall W1 and the second side wall W2 can be protected by the third side wall W3 and the fourth side wall W4.

Various modifications may be conceivable. For example, the first direction is perpendicular to the second direction. However, the first direction may be directed in parallel to the second direction.

In the above-described embodiment, the scorotron charger 52 is exemplified as the charger. However, charging rollers may be available as the charger.

The drum unit according to the above-described embodiment is applied to the color printer 1. However, the drum unit may be applied to an image recording apparatus other than the color printer 1, such as a monochromatic printer, a copying machine, and a multifunction peripheral.

In the above-described embodiment, the heavy paper, the postcard, and the thin paper are available as the sheet S. However, an OHP sheet is also available as the sheet S.

In the above-described disclosure, the conveyer belt 73 is exemplified as the transfer member. However, transfer rollers contacting the photosensitive drums 51 may be available as the transfer member.

While the description has been made in detail with reference to the specific embodiment and modifications, it would be apparent to those skilled in the art that various changes and modifications may be made without departing from the scope and spirit of the disclosure.

What is claimed is:

1. A drum unit comprising:
a first photosensitive drum rotatable about a first axis extending in a first direction;
a second photosensitive drum rotatable about a second axis extending in the first direction;
a first side wall positioned at one end of the first photosensitive drum in the first direction, the first side wall supporting both of the first photosensitive drum and the second photosensitive drum, the first side wall being made of metal;
a first resin wall being positioned at the one end of the first photosensitive drum, the first resin wall being made of resin;
a second resin wall being positioned at another end of the first photosensitive drum, the second resin wall being made of resin; and
a developing unit comprising:
a magnetic roller rotatable about a third axis extending in the first direction, the magnetic roller facing a surface of the first photosensitive drum;
a developer container configured to accommodate carrier;
a first auger positioned in the developer container and rotatable about a fourth axis extending in the first direction, the first auger being configured to circulate the toner and the carrier in the developer container; and
a second auger positioned in the developer container and rotatable about a fifth axis extending in the first direction, the second auger being configured to convey the toner and the carrier to the magnetic roller,
wherein the first side wall and the photosensitive drum are positioned between the first resin wall and the second resin wall in the first direction.

2. The drum unit according to claim 1 further comprising:
a second side wall positioned at the another end of the first photosensitive drum in the first direction, the second side wall supporting both of the first photosensitive drum and the second photosensitive drum, the second side wall being made of metal, the second side wall being positioned between the first side wall and the second resin wall in the first direction.

3. The drum unit according to claim 2,
wherein the first side wall further supports the developing unit.

4. The drum unit according to claim 3 further comprising:
a second developing unit comprising:
a second magnetic roller rotatable about a sixth axis extending in the first direction, the second magnetic roller facing a surface of the second photosensitive drum,
a second developer container configured to accommodate carrier;
a third auger positioned in the second developer container and rotatable about a sixth axis extending in the first direction, the third auger being configured to circulate toner and carrier in the second developer container; and
a fourth auger positioned in the second developer container and rotatable about a seventh axis extending in the first direction, the fourth auger being configured to convey the toner and the carrier to the magnetic roller,
wherein the first side wall further supports the second developing unit.

5. The drum unit according to claim 3, wherein the first side wall is formed with a first hole allowing one end portion in the first direction of the developing unit to be inserted into the first hole, so that the one end portion is supported by the first side wall.

6. The drum unit according to claim 5 further comprising a cylindrical member,
wherein the second side wall is formed with a second hole; and
wherein the cylindrical member is inserted into the second hole, the cylindrical member having an opening in which another end portion in the first direction of the developing unit is inserted.

7. The drum unit according to claim 1,
wherein the developing container has an inlet allowing toner to be replenished, the inlet is positioned opposite to the magnetic roller with respect to the first auger and the second auger.

8. The drum unit according to claim 7, wherein the inlet is positioned above the first auger and the second auger; and
wherein the third axis is positioned below the first auger and the second auger.

9. The drum unit according to claim 8, wherein the developing unit further comprises a layer thickness regulation member configured to regulate a thickness of a toner layer formed on the magnetic roller, the layer thickness regulation member being out of contact with the magnetic roller.

10. The drum unit according to claim 9, wherein the layer thickness regulation member is positioned below the first auger and the second auger.

11. The drum unit according to claim 7, wherein the first auger is configured to convey the toner replenished from the inlet to the second auger;
wherein the second auger is configured to supply the toner conveyed by the first auger to the magnetic roller; and
wherein the magnetic roller is configured to supply the toner supplied from the second auger to the first photosensitive drum.

12. The drum unit according to claim 7, wherein the first auger is positioned closer to the inlet than the second auger is to the inlet.

13. The drum unit according to claim 1, wherein the magnetic roller is positioned apart from the surface of the first photosensitive drum.

14. The drum unit according to claim 1, wherein the drum unit further comprises a charger configured to charge the first photosensitive drum.

15. The drum unit according to claim 14, wherein the charger is a scorotron charger.

16. The drum unit according to claim 1, wherein the drum unit further comprises a sheet guide configured to guide a sheet toward the first photosensitive drum.

17. The drum unit according to claim 1, wherein the drum unit further comprises a cleaning roller configured to perform cleaning on the first photosensitive drum.

18. An image forming apparatus comprising:
a housing formed with an opening and having a cover movable between an open position where the cover opens the opening and a closed position where the cover closes the opening;
a toner cartridge configured to accommodate therein toner; and
a drum unit movable through the opening between an accommodated position where the drum unit is positioned in the housing and a pulled-out position where the drum unit is pulled out of the housing, the drum unit comprising:

a first photosensitive drum rotatable about a first axis extending in a first direction;

a second photosensitive drum rotatable about a second axis extending in the first direction;

a first side wall positioned at one end of the first photosensitive drum in the first direction, the first side wall supporting both of the first photosensitive drum and the second photosensitive drum, the first side wall being made of metal;

a first resin wall being positioned at the one end of the first photosensitive drum, the first resin wall being made of resin;

a second resin wall being positioned at another end of the first photosensitive drum, the second resin wall being made of resin; and a developing unit comprising:

a magnetic roller rotatable about a third axis extending in the first direction, the magnetic roller facing a surface of the first photosensitive drum;

a developer container configured to accommodate carrier;

a first auger positioned in the developer container and rotatable about a fourth axis extending in the first direction, the first auger being configured to circulate the toner and the carrier in the developer container; and a second auger positioned in the developer container and rotatable about a fifth axis extending in the first direction, the second auger being configured to convey the toner and the carrier to the magnetic roller, wherein the first side wall is positioned between the first resin wall and the second resin wall in the first direction.

19. The image forming apparatus according to claim 18, wherein the developer container is formed with an inlet allowing toner to be replenished from the toner cartridge.

20. The image forming apparatus according to claim 19, wherein the inlet is positioned between the first resin wall and the second resin wall.

* * * * *